United States Patent
Landau et al.

(10) Patent No.: US 8,126,097 B2
(45) Date of Patent: Feb. 28, 2012

(54) METHOD AND SYSTEM FOR CLUSTER PROCESSING USING CONJUGATE GRADIENT-BASED MMSE EQUALIZER AND MULTIPLE TRANSMIT AND/OR RECEIVE ANTENNAS FOR HSDPA, STTD, CLOSED-LOOP AND NORMAL MODE

(75) Inventors: Uri Landau, San Diego, CA (US); Mark Kent, Vista, CA (US); Severine Catreux-Erceg, Cardiff, CA (US); Vinko Erceg, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 59 days.

(21) Appl. No.: 12/814,674

(22) Filed: Jun. 14, 2010

(65) Prior Publication Data

US 2010/0260252 A1    Oct. 14, 2010

Related U.S. Application Data

(63) Continuation of application No. 11/565,381, filed on Nov. 30, 2006, now Pat. No. 7,738,607.

(51) Int. Cl.
*H04B 7/10* (2006.01)
*H04L 1/02* (2006.01)

(52) U.S. Cl. ......... 375/347; 375/229; 375/232; 375/354

(58) Field of Classification Search .......... 375/229, 375/354, 232, 347
See application file for complete search history.

(56) References Cited

U.S. PATENT DOCUMENTS

| 7,082,174 B1 * | 7/2006 | Smee et al. | 375/349 |
| 7,483,675 B2 * | 1/2009 | Kent et al. | 455/67.11 |
| 2006/0227891 A1 * | 10/2006 | Niu et al. | 375/267 |

* cited by examiner

*Primary Examiner* — Ted M Wang
(74) *Attorney, Agent, or Firm* — Sterne, Kessler, Goldstein & Fox PLLC

(57) ABSTRACT

A system and method for processing signals are disclosed. The method may include performing by one or more processors and/or circuits in a wireless device that includes a plurality of transmit and/or receive antennas for one or more of HSDPA, space-time transmit diversity (STTD), Closed Loop, Normal Mode and spatial multiplexing, the one or more processors and/or circuits comprising a minimum mean square error (MMSE) equalizer, generating a plurality of chip-rate synchronously sampled signals utilizing a plurality of received clusters. At least a portion of said generated plurality of chip-rate synchronously sampled signals may be simultaneously equalized in time domain and in spatial domain, based on a plurality of weight values calculated for the plurality of received clusters. The plurality of weight values may be iteratively computed utilizing a time-based adaptation method.

50 Claims, 11 Drawing Sheets

METHOD AND SYSTEM FOR CLUSTER PROCESSING USING CONJUGATE GRADIENT-BASED MMSE EQUALIZER AND MULTIPLE TRANSMIT AND/OR RECEIVE ANTENNAS FOR HSDPA, STTD, CLOSED-LOOP AND NORMAL MODE

CROSS-REFERENCE TO RELATED APPLICATIONS/INCORPORATION BY REFERENCE

This application is a continuation of U.S. patent application Ser. No. 11/565,381 filed on Nov. 30, 2006, now U.S. Pat. No. 7,738,607 which is related to the following application, which is incorporated herein by reference in its entirety:
U.S. patent application Ser. No. 11/565,365 filed on Nov. 30, 2006;
U.S. patent application Ser. No. 11/173,870 filed on Oct. 6, 2004;
U.S. patent application Ser. No. 11/174,303 filed on Oct. 6, 2004;
U.S. patent application Ser. No. 11/173,502 filed on Oct. 6, 2004; and
U.S. patent application Ser. No. 11/173,854 filed on Oct. 6, 2004.

FIELD OF THE INVENTION

Certain embodiments of the invention relate to processing of received wireless signals. More specifically, certain embodiments of the invention relate to a method and system for cluster processing using conjugate gradient-based minimum mean square error (MMSE) equalizer and multiple transmit and/or receive antennas for HSDPA, STTD, Closed Loop and Normal Mode.

BACKGROUND OF THE INVENTION

In most current wireless communication systems, nodes in the network may be configured to operate based on a single transmit and a single receive antenna. However, for many current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, code division multiple access (CDMA) based systems, time division multiple access (TDMA) based systems, wireless local area network (WLAN) systems, and orthogonal frequency division multiplexing (OFDM) based systems, such as IEEE 802.11a/g, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from the shift underway from current voice-based services to next-generation wireless multimedia services that provide integrated voice, video, and data transmission.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of M−1 interferers. Accordingly, N signals may be simultaneously transmitted in the same bandwidth using N transmit antennas, with the transmitted signal then being separated into N respective signals by way of a set of N antennas deployed at the receiver.

This type of systems may be referred to as multiple-input multiple-output (MIMO) systems. One attractive aspect of multi-antenna systems, in particular MIMOs, is the significant increase in system capacity, which may be achieved by utilizing these transmission configurations. For a fixed overall transmitted power the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from the increased size, complexity, and power consumption. Providing a separate RF chain for each transmit and receive antenna is a direct factor in the increased the cost of multi-antenna systems. Each RF chain generally comprises a low noise amplifier (LNA), a filter, a downconverter, and an analog-to-digital converter (ND). In certain existing single-antenna wireless receivers, the single required RF chain may account for over 30% of the receiver's total cost. It is therefore apparent that as the number of transmit and receive antennas increases, the system complexity, power consumption, and overall cost may increase.

Furthermore, multi-path propagation in band-limited time dispersive channels may cause inter-symbol interference (ISI), which has been recognized as a major obstacle in achieving increased digital transmission rates with the required accuracy. ISI may occur when the transmitted pulses are smeared out so that pulses that correspond to different symbols are not discernable or separable. Meanwhile, data received from a desired user may be disturbed by other transmitters, due to imperfections in the multiple access scheme, giving rise to inter-carrier interference (ICI). For a reliable digital transmission system, it is desirable to reduce the effects of ISI and ICI.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and method for cluster processing using conjugate gradient-based minimum mean square error (MMSE) equalizer and multiple transmit and/or receive antennas for HSDPA, STTD, Closed Loop and Normal Mode, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

antenna system utilizing a conjugate gradient taps optimizer, in accordance with an embodiment of the invention.

Figure 2:
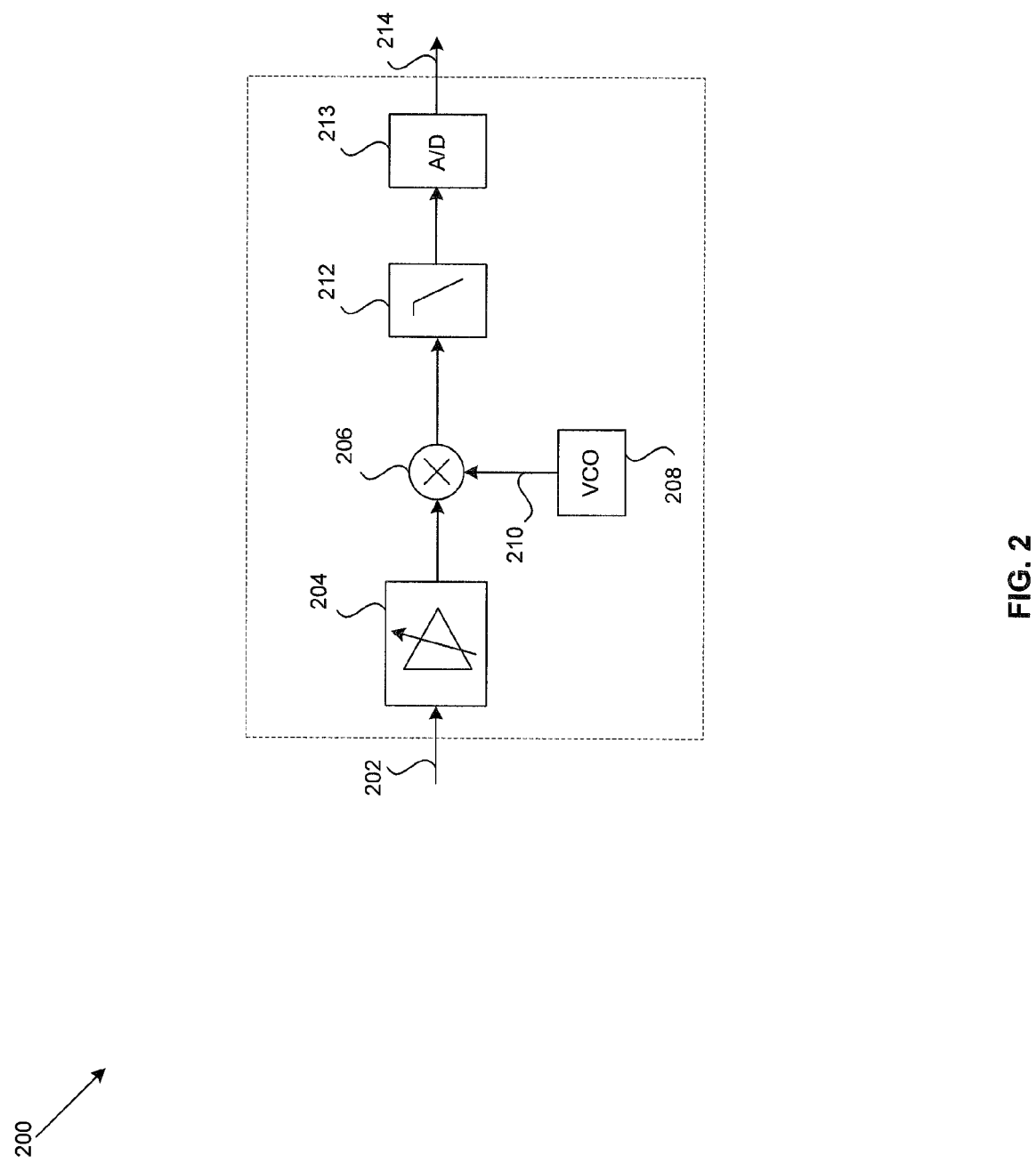

FIG. 2 is a block diagram of a radio frequency (RF) processing block that may be utilized in accordance with an aspect of the invention.

Figure 3:
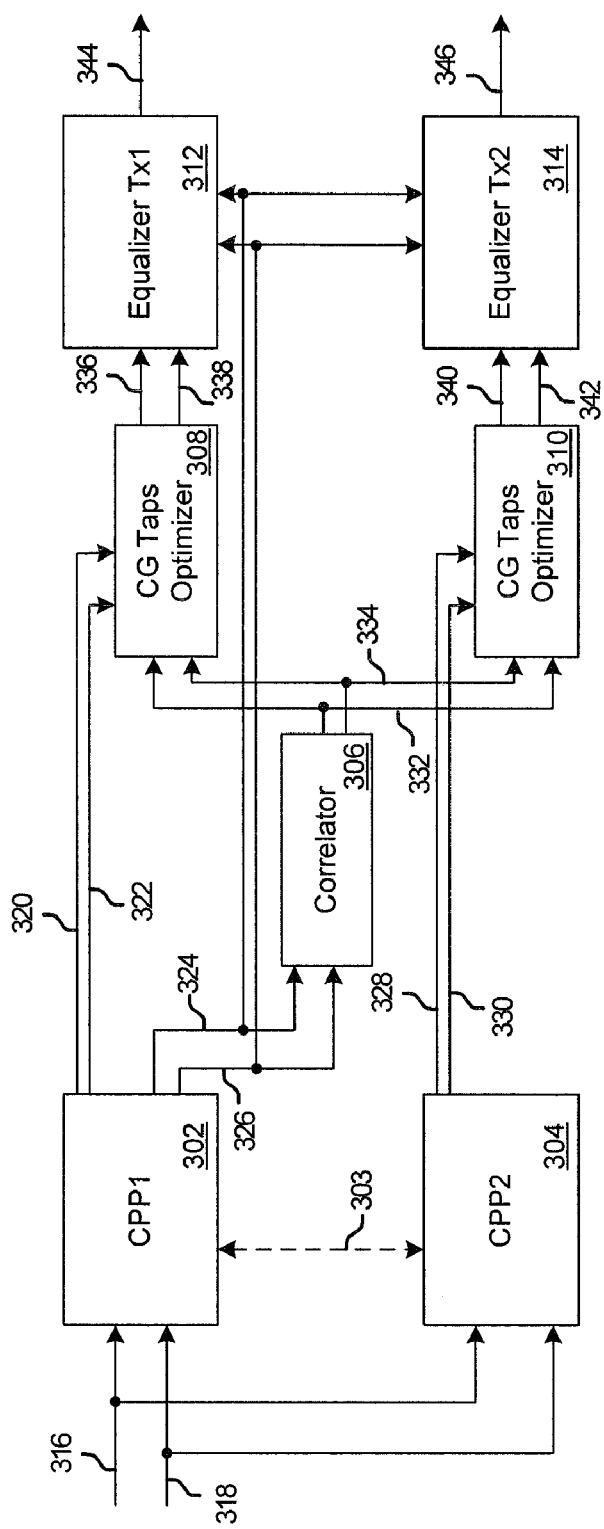

FIG. 3 is a block diagram of a receiver front end of a two-transmit-two-receive MIMO antenna system utilizing conjugate gradient optimization, in accordance with an embodiment of the invention.

Figure 4:
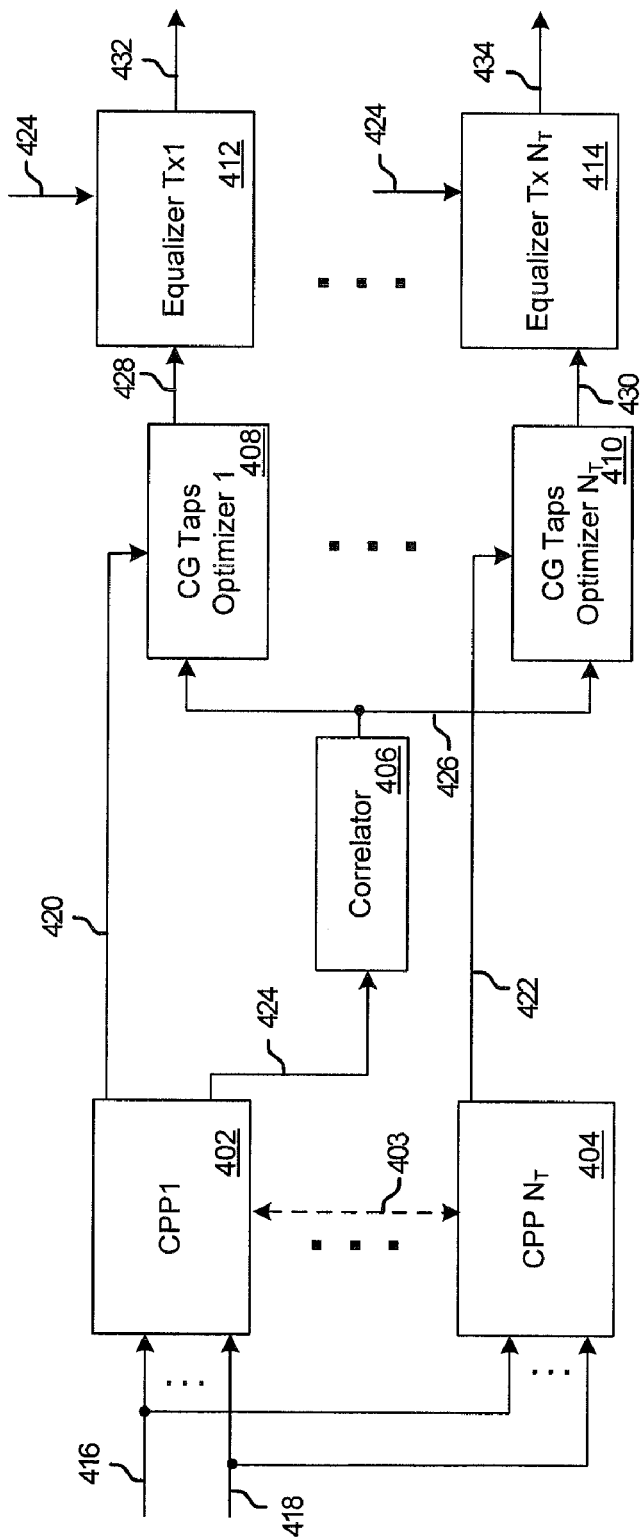

FIG. 4 is a block diagram of a receiver front end of a multiple-transmit-multiple-receive MIMO antenna system utilizing conjugate gradient optimization, in accordance with an embodiment of the invention.

Figure 5:
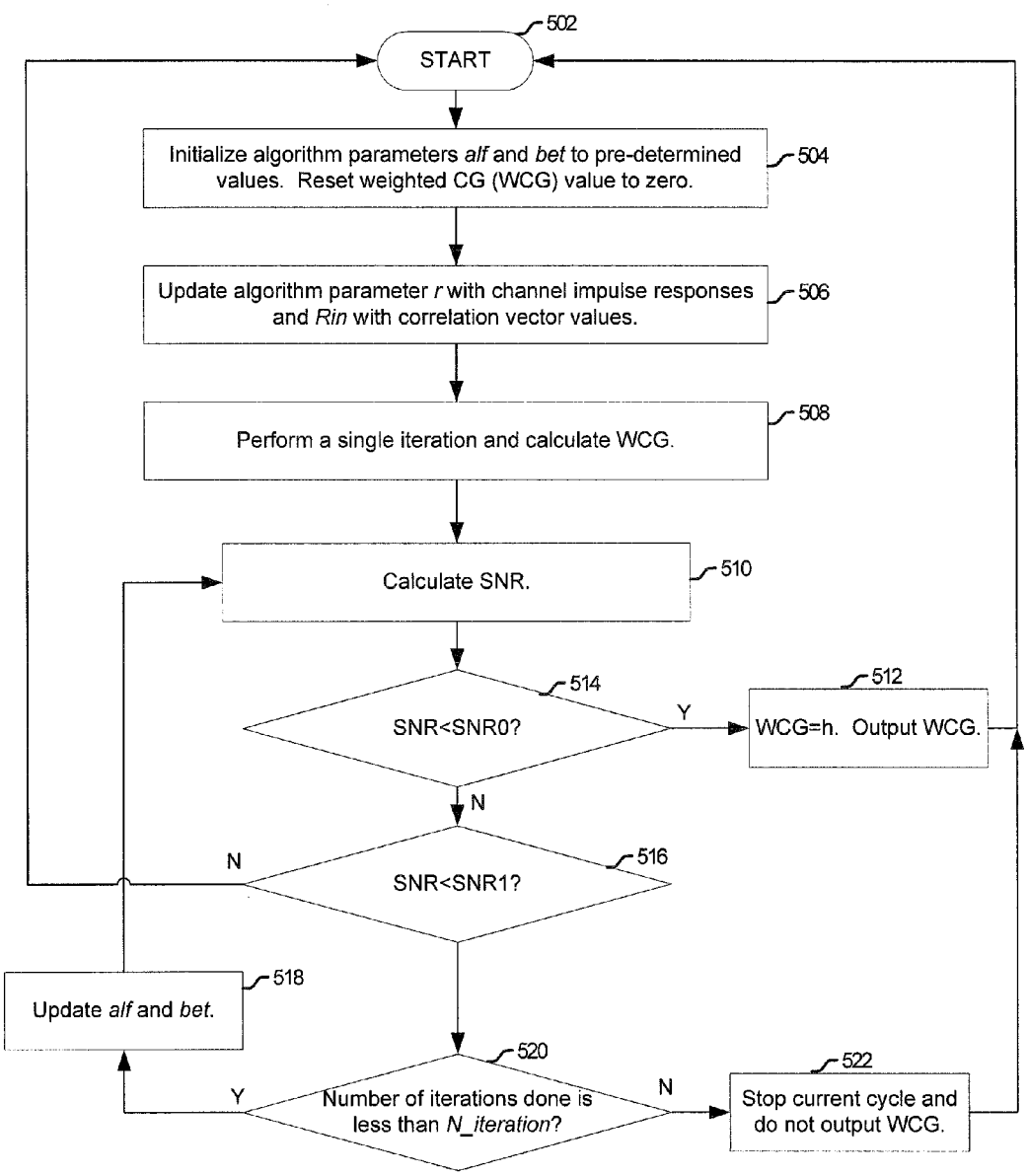

FIG. 5 is a flow diagram illustrating exemplary steps for processing signals in a receiver, in accordance with an embodiment of the invention.

Figure 6:
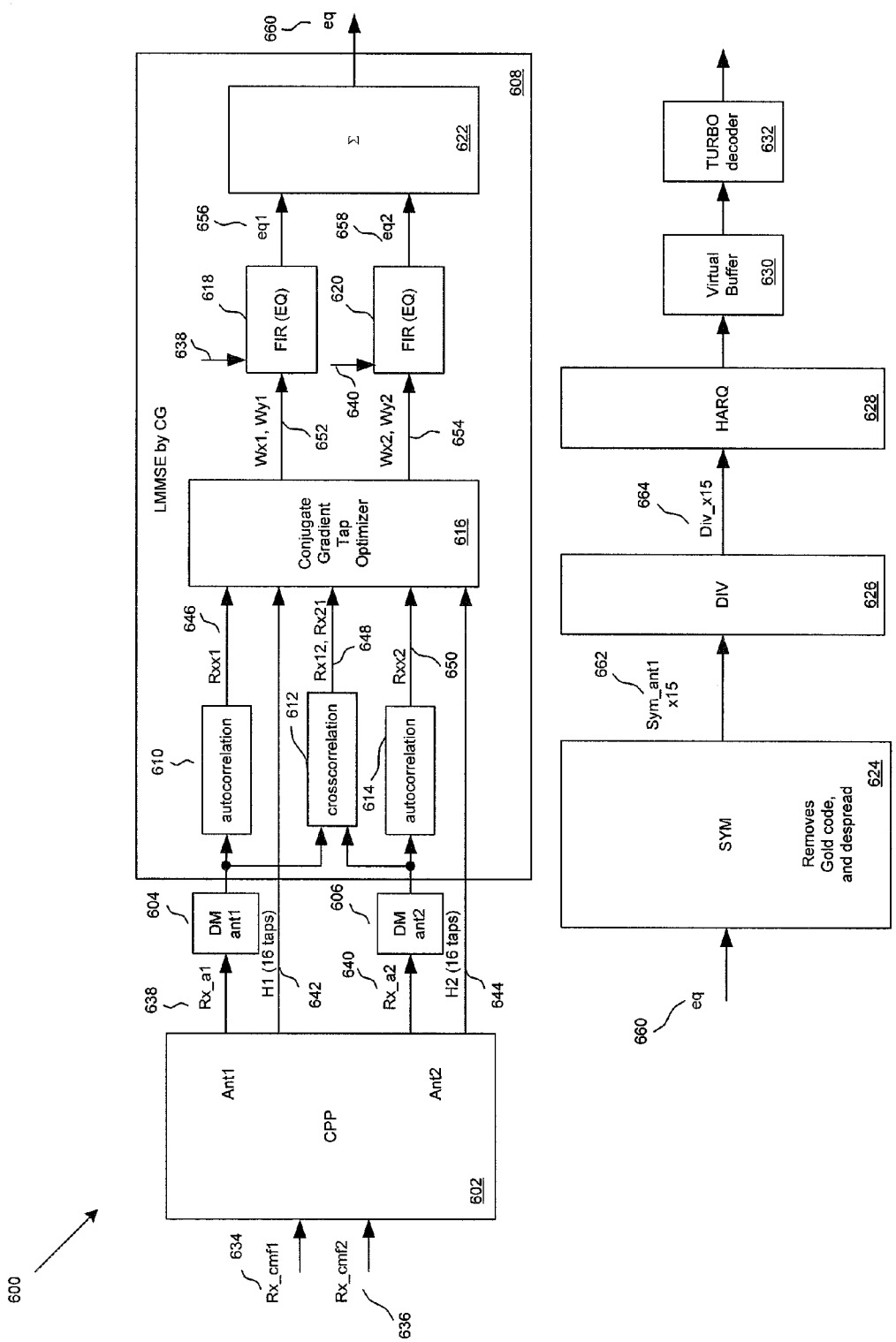

FIG. 6 is a block diagram of an HSDPA single-input-single-output (SISO) or single-input-multiple-output (SIMO) receiver utilizing conjugate gradient optimization, in accordance with an embodiment of the invention.

Figure 7A:
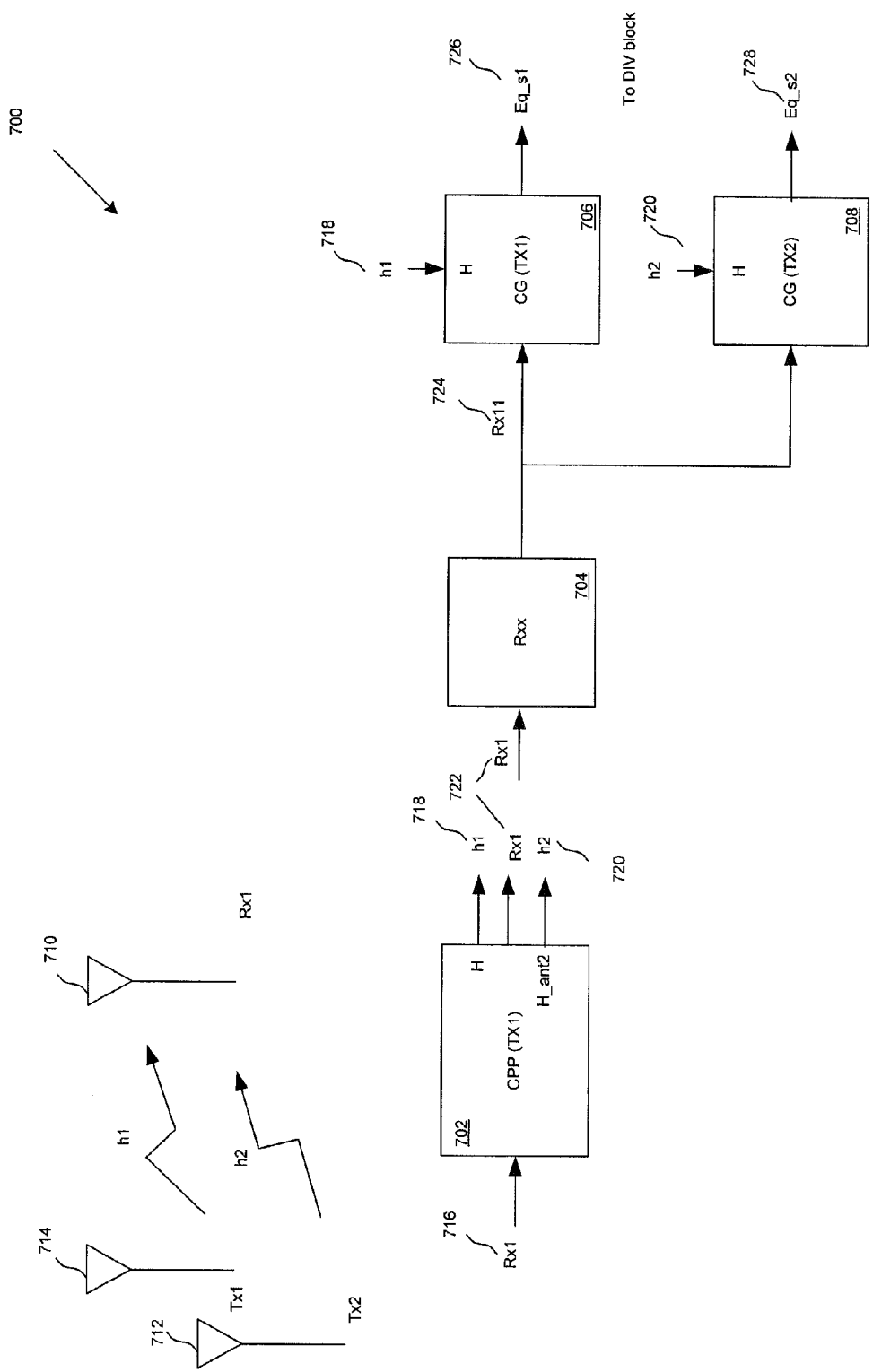

FIG. 7A is a block diagram of a multiple-input-single-output (MISO) receiver utilizing conjugate gradient optimization, in accordance with an embodiment of the invention.

Figure 7B:
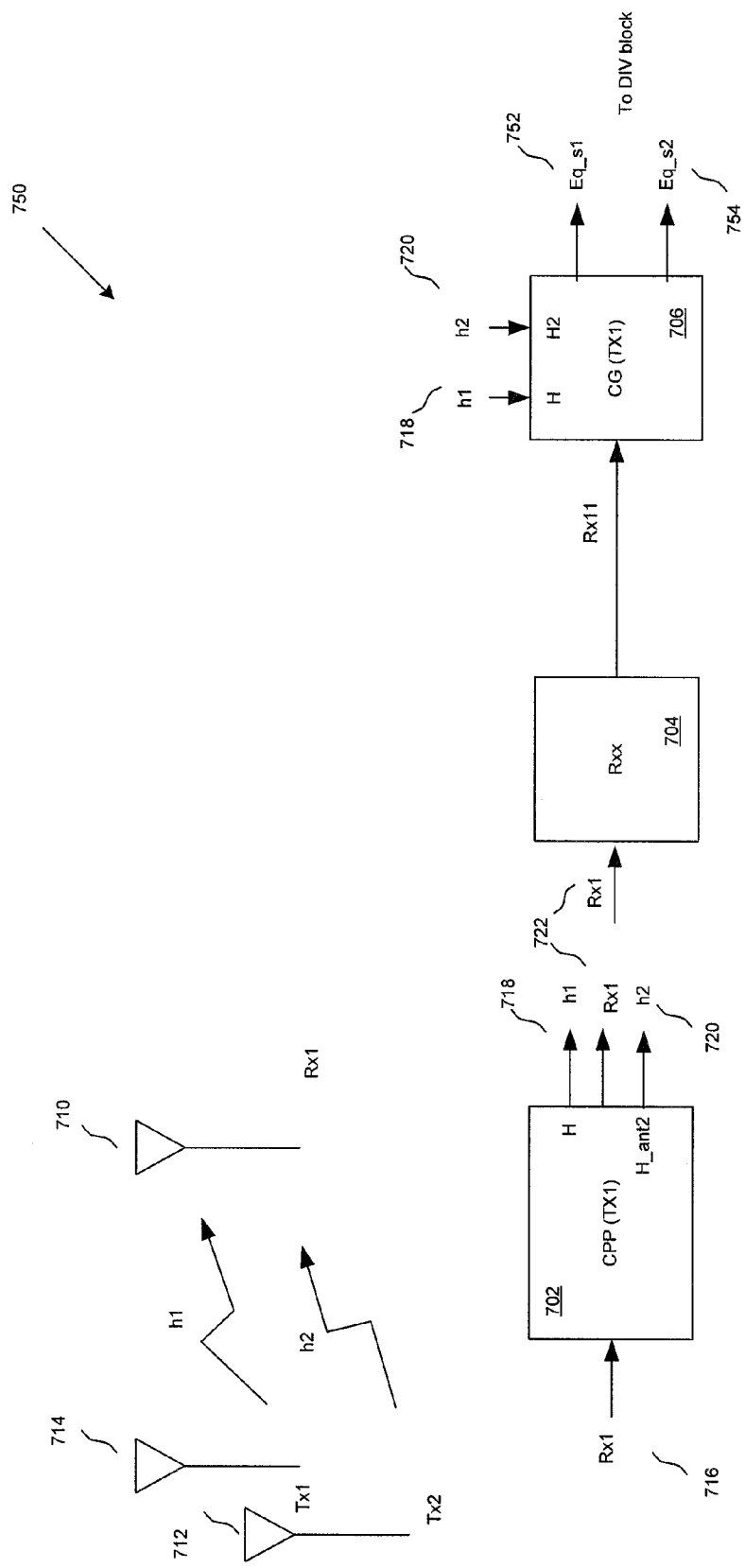

FIG. 7B is a block diagram of a multiple-input-single-output (MISO) receiver utilizing conjugate gradient optimization, in accordance with an embodiment of the invention.

Figure 8A:
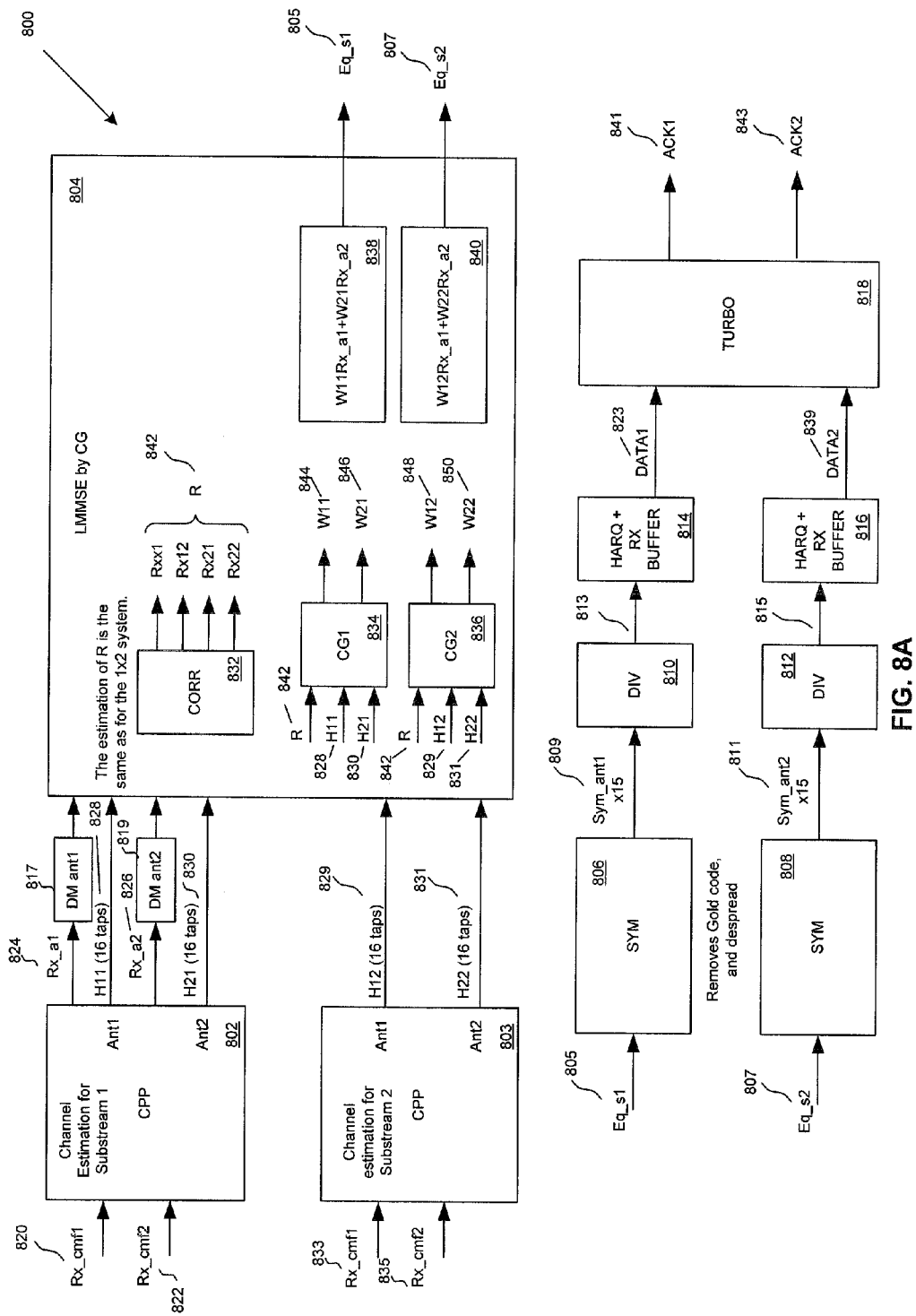

FIG. 8A is a block diagram of a multiple-input-multiple-output (MIMO) receiver utilizing conjugate gradient optimization and linear processing, in accordance with an embodiment of the invention.

Figure 8B:
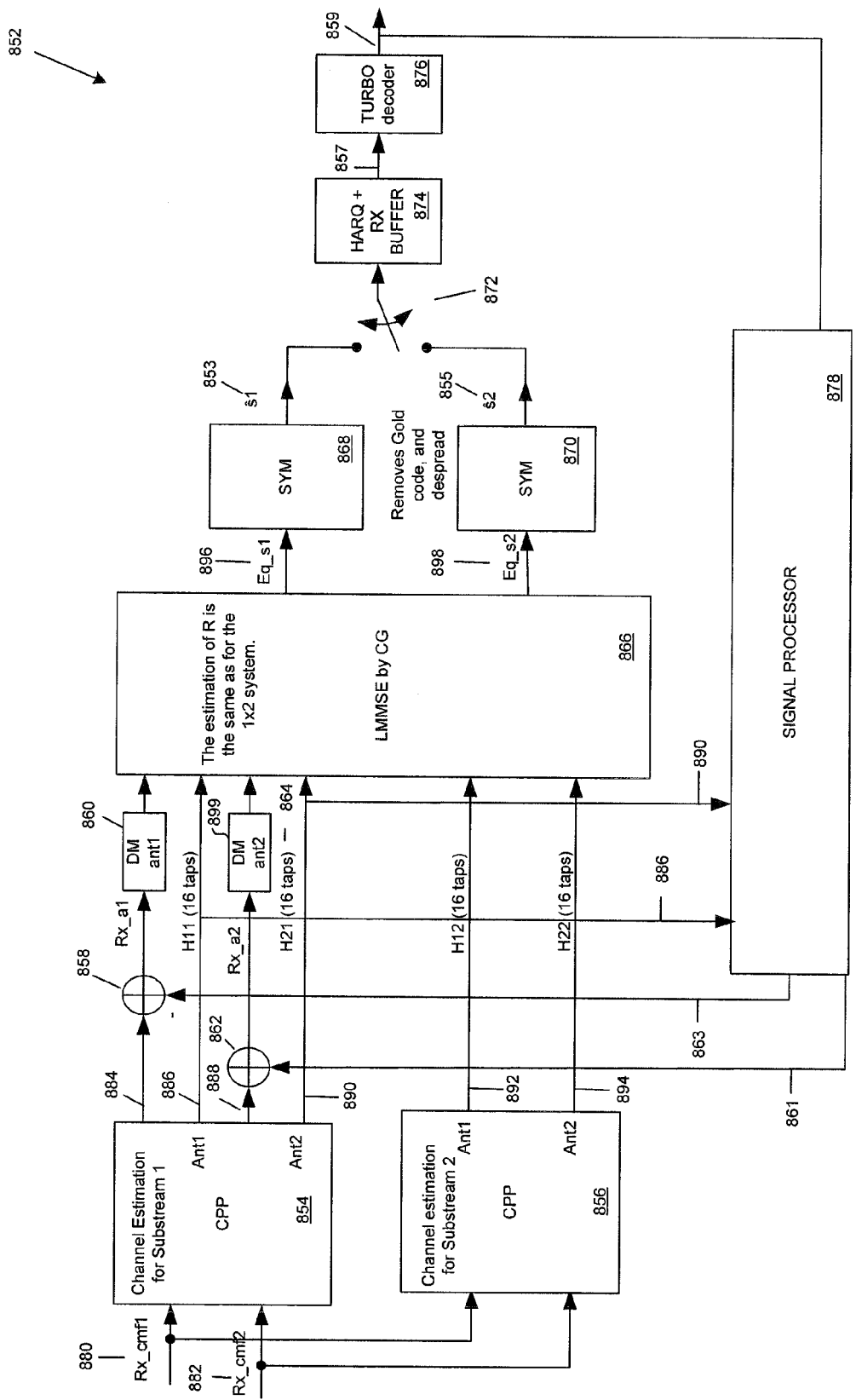

FIG. 8B is a block diagram of a multiple-input-multiple-output (MIMO) receiver utilizing conjugate gradient optimization and non-linear processing, in accordance with an embodiment of the invention.

Figure 9:
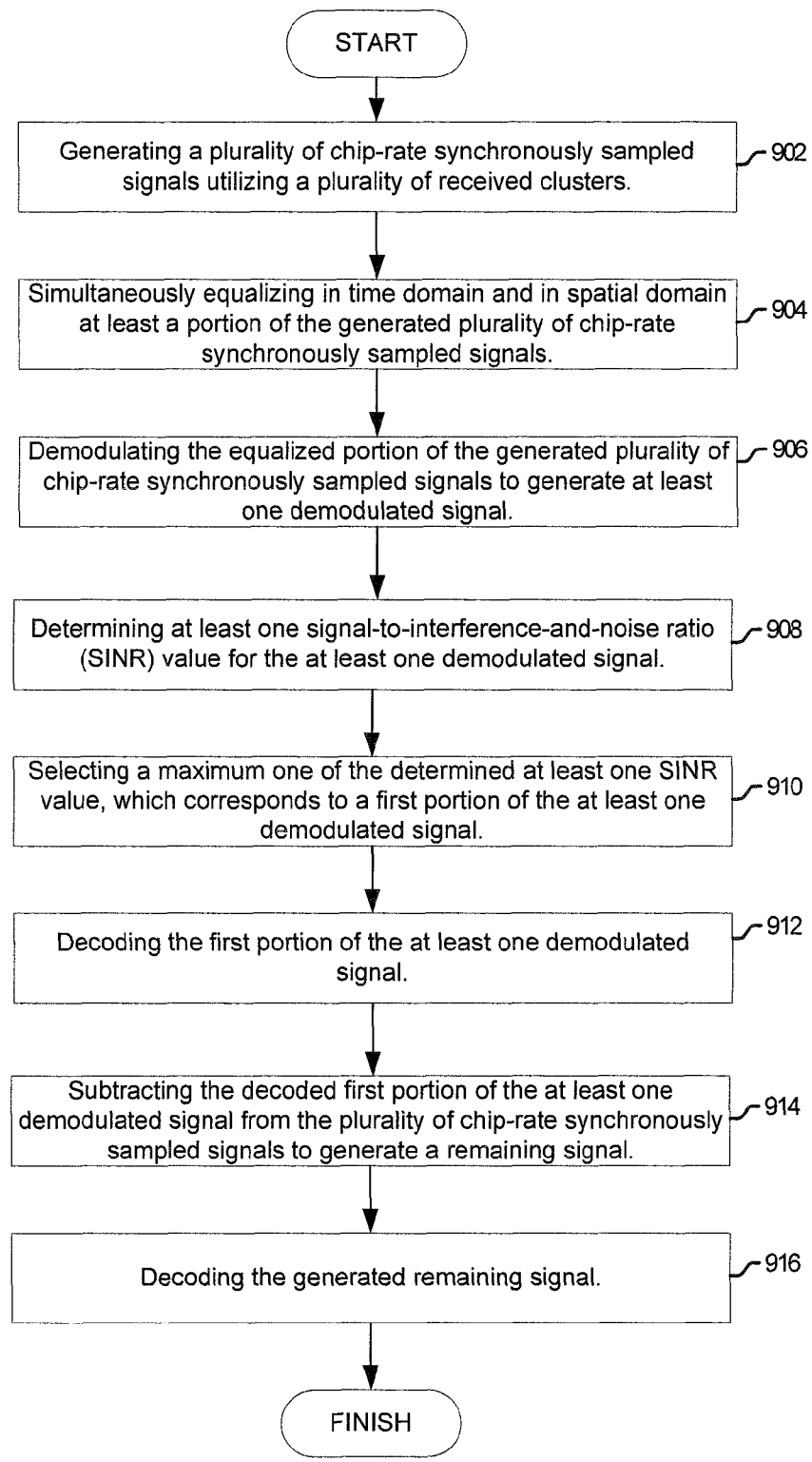

FIG. 9 is a flow diagram illustrating exemplary steps for processing signals in a receiver utilizing a linear MMSE equalization, in accordance with an embodiment of the invention.

DETAILED DESCRIPTION OF THE INVENTION

Certain embodiments of the invention may be found in a method and system for cluster processing using conjugate gradient-based minimum mean square error (MMSE) equalizer and multiple transmit and/or receive antennas for HSDPA, STTD, Closed Loop and Normal Mode, and may comprise generating a plurality of chip-rate synchronously sampled signals utilizing a plurality of received clusters. At least a portion of the generated plurality of chip-rate synchronously sampled signals may be simultaneously equalized in time domain and in spatial domain. The equalization may be based on a plurality of weight values calculated for the plurality of received clusters. The weight values may be iteratively computed utilizing a time-based adaptation method, such as a conjugate gradient (CG) search. The equalized portion of the generated plurality of chip-rate synchronously sampled signals may be added to generate a total equalized signal. The total equalized signal may be demodulated to generate a demodulated signal. A convolutional code and/or a turbo code within the demodulated signal may be decoded. The equalized portion of the generated plurality of chip-rate synchronously sampled signals may be demodulated to generate at least one demodulated signal. At least one signal-to-interference-and-noise ratio (SINR) value may be determined for the demodulated signal. A maximum one of the determined at least one SINR value may be selected. The selected maximum SINR value may correspond to a first portion of the demodulated signal. The first portion of the demodulated signal may be decoded. The decoded first portion may be subtracted from the plurality of chip-rate synchronously sampled signals to generate a remaining signal, which may be decoded.

In one embodiment of the invention, a time-based adaptation may be used for cluster processing, where the equalization weights may be computed iteratively to converge towards a general MMSE solution. By computing the correlation matrix of the received signals, the spatial and temporal correlation matrices of the interfering signals may be automatically accounted for and taken into consideration. In some instances, the interference due to other cell signals may be the dominant type of degradation in a typical cellular deployment, such interference may be accounted for and used by a demodulator, for example, in order to approach the performance of an optimal Wiener filter, which may be one of the highest possible for this class of receivers. In contrast, alternative methods may implement the MMSE solution with a direct approach. In such instances, the weights may be computed directly based on the knowledge of the channel response of each interferer present. This may require the detection of present interferers and estimation of their channel response. Such computation may be complex especially if the number of interferers is high and the conditions are changing at a fast rate.

Figure 1:
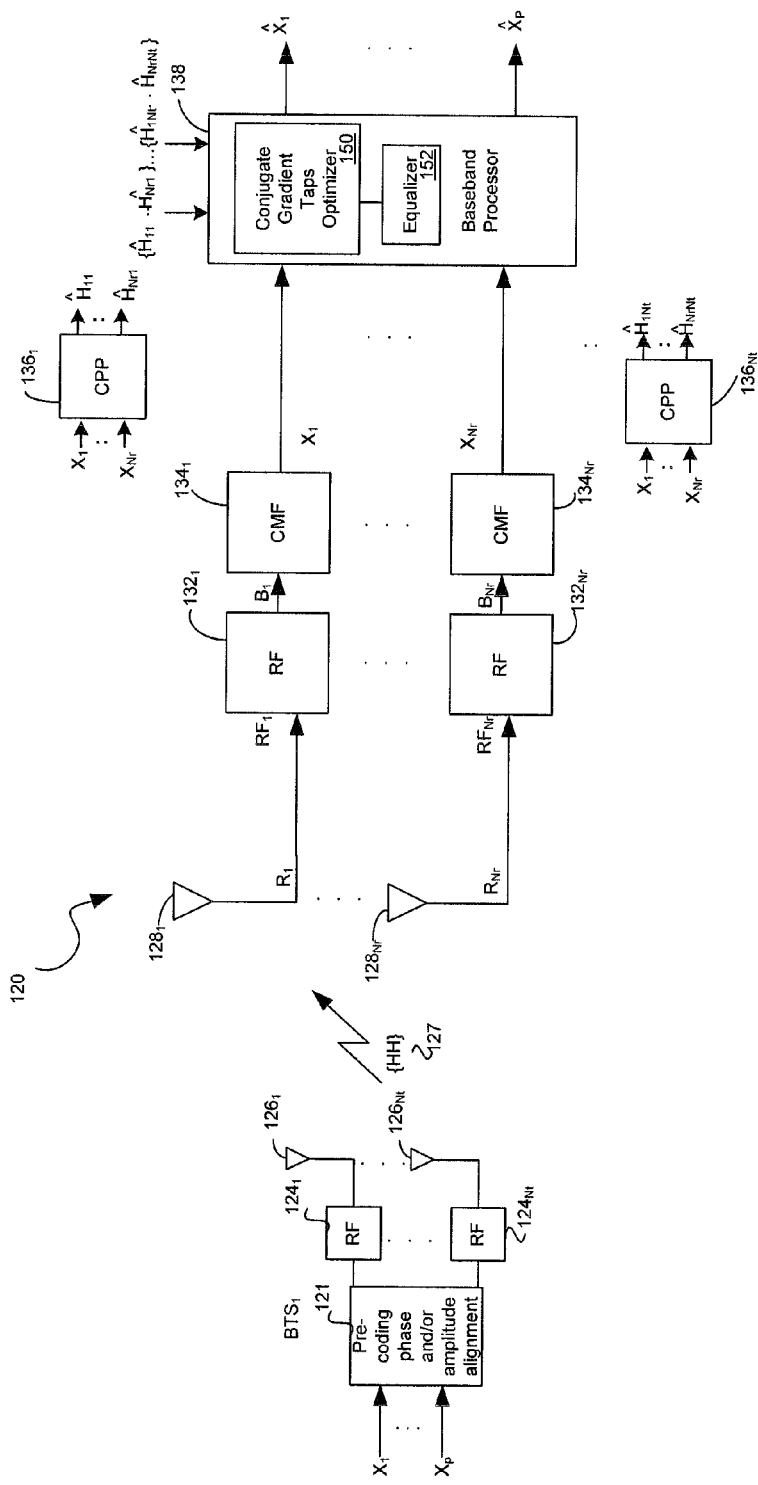
FIG. 1 is a block diagram of an exemplary spatial multiplexing (SM) multiple-input multiple-output (MIMO)

FIG. 1 is a block diagram of an exemplary spatial multiplexing (SM) multiple-input multiple-output (MIMO) antenna system utilizing a conjugate gradient taps optimizer, in accordance with an embodiment of the invention. Referring to FIG. 1, there is shown a transceiver system 120 that may comprise a baseband transmit station (BTS) BTS1, a plurality of receive antennas $128_{1...Nr}$, a plurality of radio frequency (RF) receive blocks $132_{1...Nr}$, a plurality of chip matched filters (CMF) $134_{1...Nr}$, a plurality of cluster path processors (CPP) $136_{1...Nr}$, and a baseband processor 138.

On the transmit side, the baseband transmit station BTS1 may comprise pre-coding phase and/or amplitude alignment block 121, $N_t$ number of RF transmit blocks $124_{1...Nt}$, and N number of antennas $126_{1...Nt}$ for the BTS1. The BTS1 may transmit one or more spatially multiplexed signals over channels having actual time varying impulse responses. The total time varying impulse response 127 of all receive and transmit channels utilized within the transceiver system 120 may correspond to the channel matrix HH. In one aspect of the invention, the BTS1 may utilize spatial multiplexing techniques to transmit one or more signals utilizing the transmit antennas $126_{1...Nt}$ which correspond to BTS1. However, the invention may not be limited in this regard. For example, the transmit side may comprise additional baseband transmit stations and one or more antennas from other BTSs may be utilized during the same transmission of the spatially multiplexed signal. Or alternatively, the BTS1 may utilize transmit diversity techniques to transmit one or more signals utilizing a-coding phase and/or amplitude alignment block 121 and the transmit antennas $126_{1...Nt}$.

The RF transmit blocks $124_{1...Nt}$ may comprise suitable logic, circuitry, and/or code that may be adapted to process an RF signal. The RF transmit blocks $124_{1...Nt}$ may perform, for example, filtering, amplification, and/or analog-to-digital (ND) conversion operations. The plurality of transmit antennas $126_{1...Nt}$ may transmit the processed RF signals from the plurality of RF transmit blocks $124_{1...Nt}$ to a plurality of receive antennas $128_{1...Nr}$.

The plurality of RF receive blocks $132_{1...Nr}$ may comprise suitable logic, circuitry and/or code that may be adapted to amplify and convert the received analog RF signals $R_{1...Nr}$ down to baseband frequency. The plurality of RF receive blocks $132_{1...Nr}$ may each comprise an analog-to-digital (ND) converter that may be utilized to digitize the received analog baseband signal, as well as voltage controlled oscillator, a mixer, and/or a low pass filter.

The plurality of chip matched filters (CMF) $134_{1...Nr}$ may comprise suitable logic, circuitry, and/or code that may be adapted to filter outputs of the plurality of RF receive blocks $132_{1...Nr}$ so as to produce in-phase (I) and quadrature (Q) components. In this regard, in an embodiment of the invention, the plurality of chip matched filters (CMF) $134_{1...Nr}$ may comprise a pair of digital filters, for example, that may be adapted to filter the I and Q components to within the bandwidth of WCDMA baseband, for example 3.84 MHz.

The plurality of cluster path processors (CPP) $136_{1...Nt}$ may be adapted to generate a plurality of Nr×Nt channel estimates of the actual time varying impulse responses. A $CPP_i$ (i=1 ... Nt) generates the channel estimates $\hat{H}_{1i}, ... \hat{H}_{Nri}$ received at antennas $R_{1...Nr}$. The baseband processor 138 may be adapted to receive a plurality of in-phase ($I_i$) and quadrature ($Q_i$) are components of $X_i$ (i=1 ... $N_r$) Output from the plurality of chip-matched filters (CMF) $134_{1...Nr}$. Block 138 also receives the estimates $\hat{H}_{1i}, ... \hat{H}_{Nri}$. The baseband processor 138 may then generate a plurality of estimates $\hat{X}_1$ to $\hat{X}_P$ of the original input signals $X_1$ to $X_P$ per baseband transmit station.

In operation, the transceiver system 120 may receive wireless signals, which may be distorted due to fading effect and other distorting phenomena. In this regard, the baseband processor 138 may utilize signal equalizing, or filtering, to reverse the effect of the communication channel or media interferences. In an exemplary embodiment of the invention, the baseband processor 138 may also comprise one or more conjugate gradient taps optimizer blocks (CGTO) 150 and one or more equalizers 152. The CGTO 150 may comprise suitable circuitry, logic and/or code and may utilize a conjugate gradient-based algorithm to calculate one or more equalizer filter tap settings. The calculated equalizer taps may be used by the equalizer 152 to equalize or filter the received signal estimate. The equalizer 152 may also update an error function at a given rate, while the conjugate gradient-based algorithm in the CGTO 150 may continuously iterate, for example a plurality of cycles for each update, so that the equalizer taps may be updated and optimized by the CGTO 150 for the received wireless signal. In another embodiment of the invention, the algorithm used by the CGTO 150 may be based on a Minimum Mean Square Error (MMSE) algorithm. In this regard, the CGTO 150 may utilize a reduced number of calculation cycles, for example by eliminating matrix-vector multiplication, which may result in increased processing time and reduced implementation costs.

FIG. 2 is a block diagram of a radio frequency (RF) processing block that may be utilized in accordance with an aspect of the invention. Referring to FIG. 2, the RF processing block 200 may comprise suitable logic, circuitry, and/or code and may be adapted to amplify and convert the received analog RF signal down to baseband and then digitize it. In an exemplary aspect of the invention, the RF processing block 200 may comprise an LNA 204, a voltage controlled oscillator (VCO) 208, a mixer 206, a low pass filter (LPF) 212, and an analog-to-digital converter (ND) 213. The LNA 204 may be adapted to receive an RF signal 202 and amplify it based on a determined gain level. The VCO 208 may comprise suitable logic, circuitry, and/or code and may be adapted to output a signal of a specific frequency, which may be pre-determined, or controlled, by a voltage signal input to the VCO. The VCO signal 210 may be mixed by the mixer 206 with the amplified signal received from the LNA 204. The LPF 212 may comprise suitable logic, circuitry, and/or code and may be adapted to receive the mixed signal from the mixer 206. The frequencies of the mixed signal may be limited by the LPF 212 to a determined range of frequencies up to a certain upper frequency limit, and the LPF 212 may output that range of frequencies as a baseband signal to the ND 213. The ND converter 213 may comprise suitable logic, circuitry, and/or code that may be adapted to receive the limited analog baseband signal from the LPF 212 and output a digital signal 214, which may sample the analog signal at a pre-defined rate.

FIG. 3 is an exemplary block diagram described in FIG. 1. It shows the block diagram of a receiver front end of a two-transmit-two-receive (Nt=2; Nr=2) MIMO antenna-system utilizing conjugate gradient optimization, in accordance with an embodiment of the invention. Referring to FIG. 3, there is illustrated a receiver front end comprising cluster path processors CPP1 302 and CPP2 304, a correlator block 306, CGTO blocks 308 and 310, and equalizer blocks 312 and 314.

The CPPs 302 and 304 may comprise suitable circuitry, logic and/or code and may enable the generation of the channel estimates ($\hat{H}_{11}, \hat{H}_{12}, \hat{H}_{21}, \hat{H}_{22}$). A designated CPP named Master CCP (302) provides the chip-rate (or multiple chip-rate) clocking signal to the entire receiver. It facilitates the removing of the time-tracking circuitry from all the other CPP's and the generation of timely synchronous outputs (the channels estimates) from all the CPP's. Furthermore, the Master CPP (302) receives signals from each CPP (304) that indicate the strength of the aggregate channels (for example, measured by the mean power of all channels) and the aggregate time position—of the channels processed—relative to the Master CPP clocking signal. The Master CPP (302) is equipped with circuitry/software that facilitates a clocking-signal that tracks the aggregate received timing and power signals from all CPP's in a manner and accuracy that is required. In this respect the connection 303—between the Master CPP 302 and CPP 304—facilitates the flow of time, power signals, and may include other information, to the Master CPP. Block 302, also, outputs the timing signals, through 303, to the entire receiver. The channel response estimates ($\hat{H}_{11}, \hat{H}_{12}, \hat{H}_{21}, \hat{H}_{22}$) 320, 328, 322, 330 and the signals X'1 324 and X'2 326—from CPPB 302 and 304—may be fully synchronized in a sense of being sampled by a single clock.

The correlator block 306 may comprise suitable circuitry, logic and/or code and may enable generation of correlation vectors 332 and 334 of the two receive antennas, based on the generated chip-rate synchronously sampled signals X'1 326 and X'2 324 received from the time-master CPP 302. The correlation vectors 332 may comprise correlations R11 and R12, and correlation vectors 334 may comprise correlations R21 and R22.

The CGTO blocks 308 and 310 may comprise suitable circuitry, logic and/or code and may enable generating and updating of equalizer tap values 336, ..., 342, based on, for example, a conjugate gradient-based algorithm. The generated equalizer tap values 336, ..., 342 may be communicated to the equalizer blocks 312 and 314 for further processing.

The equalizer blocks 312 and 314 may comprise suitable circuitry, logic and/or code and may generate received signal estimates 344 and 346 based on the generated chip-rate synchronously sampled signals X'1 326 and X'2 324 and the updated equalizer taps 336, ..., 342.

In operation, the CPPB 302 and 304 may receive input signal X1 316 from a first antenna, and input signal X2 318 from a second antenna. The received signals 316 and 318 may have been transmitted from two transmit antennas. The CPP 302 may generate channel responses $\hat{H}_{11}$ 320 and $\hat{H}_{21}$ 322, based on received wireless signals X1 316 and X2 318 received via two receive antennas. The received signals may be represented as $X_r$ (r=1:2). The CPP 304 may generate channel responses $\hat{H}_{12}$ 328 and $\hat{H}_{22}$ 330, also based on input wireless signals X1 316 and X2 318. Each channel response $\hat{H}_{ri}$ (i=1:2, r=1:2) may comprise a vector of $N_{CH}$ taps, where $N_{CH}$ may comprise the delay spread of the channel. The generated channel responses $\hat{H}_{11}$ 320 and $\hat{H}_{21}$ 322 may be communicated to CGTO 308, and the generate channel responses $\hat{H}_{12}$ 328 and $\hat{H}_{22}$330 may be communicated to the CGTO 310.

The coming signal may be transmitted through two transmit antennas and may be received by two receiver antennas first, and then may be processed by two CPP's (Cluster Path Processes) 302 and 304. Each CPP–i (i=1,2) 302, 304 may generate a plurality of channel response—$\hat{H}_{ri}$ (r=1:2) 320, 322, 328, 330 of the desired signal, where each channel response may comprise a vector of Nch taps, and Nch may be the delay spread of the channel.

As explained before, the CPP 302 may be defined as the time-master CPP and may be utilized to receive timing signals from all the other CPP's and may generate the chip clocking signal. This chip clock or other time signal, which may comprise multiple chip clock-time, may be used to sample the input signals Xr (r=1:2) 316, 318, creating the output X1'316 and X2'318 and the channel responses—$\hat{H}_{ri}$ (r=1:2; i=1:2) 320, 322, 328, 330, as well as other generated signals. The received signals Xr (r=1:2) 316, 318 that clocked at chip rate may be further processed in the correlate-generator 306 block that may generate the vector set of correlations {Rr1,r2} 332, 334. Each vector Rr1,r2 (r1=1:NR; r2=1:NR) may comprise the correlation taps that are given by the following equation:

$$Rr1,r2(n)=E\{Xr1 \cdot X^*r1-n\},$$

where n=0:Nch−1 and "*" is the complex conjugate.

The correlation set {Rr1,r2(n);} 332, 334 together with the set of channel responses vectors $\hat{H}_{ri}$ (r=1:2; i=1:2) 320, 322, 328, 330 may be input into the CG (i=1:2) 308, 310 that may generate the equalizer taps (w_cg). The taps may be updated according to changes in the channel estimates the SNR and other conditions described within the context of this invention.

The CG tape-optimizer blocks 308, 310 may utilize the CG algorithm described herein below as well as with regard to FIG. 5, and may use MMSE criteria, for example. One or more modifications related to this algorithm may also be utilized, such as initialization/re initialization block, control block for the number of iteration, and/or block that estimates the convergence status.

In an exemplary embodiment of the invention, the CGTO blocks 308 and 310 may utilize a conjugate gradient-based (CG) algorithm for generating and updating the equalizer taps 336, . . . , 342. The CG algorithm may be expressed by the following pseudo code:

---
STEP 1
---

```
If initialization_flag
    alf             = alf_0
    bet             = bet_0
    w_cg            = zeros(2*M,1);
end
```

---
STEP 2
---

```
If updating_clk
    r               = h;
    p               = r;
    R               = R_in;
end
```

STEP 3

```
If Iteration_clk & iteration_flg
    Rp              = R*p;
    r_curr          = r'*r;
    pRp             = p'*Rp;
    w_cg            = w_cg + alf*p;
    r               = h − R*w_cg;
    p               = r + bet*p;
    nm_iter         = nm_iter + 1;
end
```

STEP 4

```
snr_cg              = Get_CG_SNR(w_cg, H);
```

STEP 5

```
if (snr_cg < snr_0) & (iter_flag == 0)
    w_cg            = h;
    iter_flag       = 1;
    nm_iter         = 0;
elseif snr_cg < snr_1
    if nm_iter < N_iterations
        update alf;
        update bet;
    else
        iteration_flg = 0;
    end
end
```

During an exemplary equalizer tap calculation in accordance with the above algorithm, at step 1, the algorithm parameters alf and bet may be initialized to alf_0 and bet_0. The initial desired solution w_cg may also be initialized to a zero-vector. The algorithm parameters alf and bet may be expressed by the following equations:

$$alf_k \cdot r_{k-1}/p^T_{k-1}Rp_{k-1}; \text{ and}$$

$$bet_k = p^T_{k-1}Ar_{k-1}/p^T_{k-1}Rp_{k-1},$$

where $r_k$ may comprise a vector of dimension N, calculated at the $k^{th}$ iteration, $p_k$ may comprise a vector of the same dimension, calculated at the $k^{th}$ iteration, and R may comprise an array of N×N dimension. Therefore, each calculation iteration may utilize $N^2+3×N$ multiplications and 2 division operations. In this regard, calculation complexity of the CG algorithm may be significantly reduced by presetting values alf_0 and bet_0 to the alf and bet parameters. The alf_0 and bet_0 values may be pre-calculated and used in the CG algorithm. In addition, the values may be dynamically exchanged during execution of the CG algorithm, based on pre-defined conditions. For example, such pre-defined conditions may be characterized by the Signal-to-Noise-Ratio (SNR). For example, the algorithm parameters alf and bet may be associated with a range of SNR values that may be measured during signal reception, and the algorithm parameters alf and bet may be reset if such SNR value is achieved. In other instances, the algorithm parameters alf and bet may be set to a desired value, which may be determined in offline testing.

During step 2 of the CG algorithm, the external conditions may be updated. In this regard, the channel response vectors H11, H12, H21, and H22 (represented by h), as well as the correlations vectors r11, r12, r21, and r22 (represent by Rin) may be input. During step 3, one iteration of the CG algorithm may be performed, if the number of iteration is less than the value N_iteration. During step 4, evaluation of the equalizer taps may be performed by calculating the SNR value. During step 5, the estimated SNR decisions related to a subsequent cycle may take place. The value snr_0 may represent a level of signal/noise when the algorithm may be ineffective and therefore may not be used. The value snr_1 may define a higher level SNR where the improvement to performance may be diminishing and therefore the algorithm may not be applied. In this regard, the CG algorithm may be effective for a range of SNR values.

For example, if snr<snr_0, the CG algorithm may output h and the equalizer blocks 312 and 314 may operate as maximum ratio combiners. The CG algorithm may then be initialized to new iteration sets. If snr<snr_1 and if the number of iteration performed is less than N_iteration, another cycle of the CG algorithm may be performed. Otherwise, the CG algorithm may halt until the next updating cycle. Within a given SNR range, the number of cycles N that the CG algorithm may be applied may be deduced. The CG algorithm, however, may not be limited to any pre-defined range of SNR values. Consequently, the algorithm parameters N, alf, and bet may be determined for a plurality of SNR ranges. It is known, to one skilled in the art, that the chosen N—the dimension (the number of taps) of w_cg the equalizer filters may be at the range of twice to four time the delay spread (measured in number of chips—$N_{ch}$ that defines the channel response). However the calculated correlation vectors r11, r12, r21, and r22 (Also called R11, R12, R21 and R22 and are the outputs 334 and 332) may be limited to the delay spread $N_{CH}$. The assigning the correlation vectors to larger vectors the non-defined value are replaced with zeros. The implementation of this invention, therefore, may include limitation on the calculation of the inner products, between two vectors, to only non-zero values and therefore reducing the calculation and the complexity load.

FIG. 4 is a block diagram of a receiver front end of a multiple-transmit-multiple-receive MIMO antenna system utilizing conjugate gradient optimization, in accordance with an embodiment of the invention. It is the architecture in the general case of Nt transmitters or antennas and Nr receivers. Referring to FIG. 4, there is illustrated a receiver front end comprising cluster path processors $CPP_{1...Nr}$ 402, ..., 404, a correlator block 406, CGTO blocks 408, ..., 410, and equalizer blocks 412, ..., 414. The input wireless signals 416, ..., 418 may be transmitted by Nt transmit antennas and received by Nr receive antennas.

In operation, the CPPB 402, ..., 404 may receive input signals 416, ..., 418 Xr (r=1:Nr) via Nr receive antennas. The CPPB 402, ..., 404 may generate channel responses $H_{r,i}$ (r=1:Nr; i=1:Nt) based on the received wireless signals 416, ..., 418. Each channel response $H_{r,i}$ may comprise a vector of $N_{CH}$ taps, where $N_{CH}$ may comprise the delay spread of the channel. The generated channel responses 420, ..., 422 $H_{r,i}$ (r=1:Nr; i=1:Nt) may be communicated to CGTO blocks 408, ..., 410.

The CPP 402 may receive a plurality of timing signals 403 from each remaining CPP, and may generate chip-rate synchronously sampled signals $X_{1...Nr}$ 424, based on the input signals 416, ..., 418. The chip-rate synchronously sampled signals $X_{1...Nr}$ 424 may be communicated to the correlator block 406. The correlator block 406 may generate vector set of correlation values $\{R_{r1,r2}\}$ 426 of the Nr receive antennas, based on the generated chip-rate synchronously sampled signals $X_{1...Nr}$ 424 received from the time-master CPP 402. The vector set of correlations $\{R_{r1,r2}\}$ 426 may comprise individual vectors. Each individual vector $R_{r1,r2}$ (r1=1:Nr, r2=1:Nr) may comprise correlation taps which may be represented by the following equation:

$$R_{r1,r2}(n) = E\{X_{r1} \cdot X^*_{r2-n}\},$$

where $n=0:N_{ch}-1$ and "*" may represent a complex conjugate. The correlation set $\{R_{r1,r2}(n)\}$ 426 and the set of channel responses vectors $H_{r,i}$ (r=1:Nr; i=1:Nt) may be communicated to the CGTO blocks 408, ..., 410. The CGTO blocks 408, ..., 410 may generate the equalizer taps 428, ..., 430 for the equalizer blocks 412, ..., 414, and may continuously update them. The equalizer blocks 412, ..., 414 may generate received signal estimates 432, ..., 434 based on the generated chip-rate synchronously sampled signals $X_{1...Nr}$ 424 and the updated equalizer taps 428, ..., 430.

FIG. 5 is a flow diagram illustrating exemplary steps for processing signals in a receiver, in accordance with an embodiment of the invention. Referring to FIG. 5, there is shown a flow diagram of the exemplary CG algorithm, as described above with regard to FIG. 3. The exemplary steps may begin at step 502. At 504, the algorithm parameters alf and bet may be initialized to pre-determined values. The weighted conjugate gradient (WCG) value may be reset to zero. At 506, the algorithm parameter r may be updated with channel impulse responses, and algorithm parameter $R_{in}$ may be updated with correlation vector values. At 508, a single iteration may be performed by the CG algorithm and WCG may be calculated.

At 510, a signal-to-noise ratio (SNR) may be calculated. At 514, it may be determined whether the calculated SNR is less than snr_0. If SNR<snr_0, then at 512, WCG may be determined as h, and the determined WCG may be output. The algorithm may then resume at step 502. If SNR is not less than snr_0, at 516, it may be determined whether SNR<snr_1. If SNR is not less than snr_1, the algorithm may reset and start again at step 502. If SNR<snr_1, at 520, it may be determined whether the number of performed iterations is less than the value of N_iterations. If the number of performed iterations is less than the value of N_iterations, at 518, the algorithm parameters alf and bet may be updated. The algorithm may then reset and continue at step 502. If the number of performed iterations is not less than the value of N_iterations, at 522, the current algorithm cycle may be stopped and no WCG value may be output. The CG algorithm may then reset and continue at step 502.

FIG. 6 is a block diagram of an HSDPA single-input-single-output (SISO) or single-input-multiple-output (SIMO) receiver utilizing conjugate gradient optimization, in accordance with an embodiment of the invention. Referring to FIG. 6, the SISO/SIMO receiver 600 may comprise a cluster path processor (CPP) 602, delay matching blocks 604, 606, and a linear minimum mean square error equalizer (LMMSEE) 608. The receiver 600 may further comprise a symbol processor 624, a diversity processor 626, a hybrid automatic repeat request (HARQ) processor 628, a virtual buffer 630, and a turbo decoder 632. The LMMSEE 608 may comprise auto-correlation blocks 610, 614, cross-correlation block 612, a conjugate gradient taps optimizer (CGTO) 616, finite impulse response (FIR) filters 618, 620, and a summer 622.

The CPP 602 may comprise suitable circuitry, logic and/or code and may enable generation of channel responses 642 and 644 based on input wireless signals 634 and 636 received via one or more receive antennas. The CPP 602 may also generate chip-rate synchronously sampled signals 638 and

640, which may be delay-matched (to synchronize with generated channel responses) by the delay matching blocks 604 and 606.

The correlator blocks 610, 612, and 614 may comprise suitable circuitry, logic and/or code and may enable generation of correlation values 646, 648, and 650, respectively, based on the generated chip-rate synchronously sampled signals 638 and 640 received from the delay matching blocks 604 and 606. The correlation values 646, 648, and 650, as well as the channel responses 642, 644 may be communicated to the CGTO block 616.

The CGTO block 616 may comprise suitable circuitry, logic and/or code and may enable generating and updating of equalizer tap values 652 and 654, based on, for example, a conjugate gradient-based algorithm. The generated equalizer tap values 652 and 654 may be communicated to the FIR filters 618 and 620 for further processing. The FIR filters 618 and 620 may comprise suitable circuitry, logic and/or code and may generate received signal estimates 656 and 658 based on the generated chip-rate synchronously sampled signals 638 and 640 and the updated equalizer/filter taps 652 and 654. The signal estimates 656 and 658 may be summed by the summer 622 to generate a combined signal estimate 660.

The symbol processor 624 may comprise suitable circuitry, logic and/or code and may be adapted to demodulate and/or despread the combined signal estimate 660. The symbol processor 624 may be also adapted to remove one or more Gold codes from the combined signal estimate 660. The diversity processor 626 may comprise suitable circuitry, logic and/or code and may be adapted to combine signals transmitted from multiple antennas in diversity modes. The diversity modes may comprise open loop (OL), closed loop 1 (CL1), and closed loop 2 (CL2).

The hybrid automatic repeat request (HARQ) processor 628 may comprise suitable logic, circuitry and/or code that may be utilized to handle the bit rate processing (such as de-interleaving and depuncturing) within the output signal 664 generated by the diversity processor 626. The output of the HARQ processor 628 may be buffered by the virtual buffer block 630 to store the data in case of retransmission and then may be processed by the turbo decoder 632. The turbo decoder 632 may comprise suitable logic, circuitry and/or code that may be utilized to handle decoding of turbo codes within the output signal generated by the HARQ processor 628. The output of the turbo decoder 632 may be a digital signal, which may comprise, for example, data information that may be suitable for use by a video display processor.

In one embodiment of the invention, the weights or equalizer tap values 652, 654 within the LMMSE equalizer 608 within the receiver 600 may be computed iteratively by a time-based adaptation method, according to a Conjugate Gradient search algorithm, for example. Furthermore, weights or equalizer tap values 652, 654 may be applied to the received signals 634, 636 by the time-based convolution modules 618, 620.

In operation, the CPP 602 may receive input signal 634 from a first antenna, and input signal 636 from a second antenna. The received signals 634 and 636 may have been transmitted from two transmit antennas. The CPP 602 may generate channel responses 642 and 644 based on received wireless signals 634 and 636 received via two receive antennas. The generated channel responses 642 and 644 may be communicated to CGTO 616. In addition, the CPP 602 may generate chip-rate synchronously sampled signals 638 and 640 based on the input signals 634 and 636, respectively. The chip-rate synchronously sampled signals may be delay-matched by the delay matching blocks 604 and 606, and the delay-matched signals may be communicated to the correlator blocks 610, 612, and 614 within the LMMSEE 608. The correlator blocks 610, 612, and 614 may generate vector set of correlation values 646, 648, and 650, respectively, based on the generated chip-rate synchronously sampled signals 638 and 640 received from the CPP 602. The vector set of correlations 646, 648, 650 may comprise individual vectors, and each individual vector $R_{r1,r2}$ (r1=1:2, r2=1:2) may comprise correlation taps.

The correlation vectors 646, 648, 650 and the set of channel responses vectors 642, 644 may be communicated to the CGTO 616. The CGTO 616 may generate the equalizer taps 652, 654 for the FIR filters, or equalizer blocks 618, 620. The equalizer blocks 618, 620 may generate received signal estimates 656, 658 based on the generated chip-rate synchronously sampled signals 638, 640 and the updated equalizer taps 652, 654. The summer 622 may sum the received signal estimates 656, 658 to generate a combined signal estimate 660. The symbol processor 624 may demodulate and/or despread the combined signal estimate 660 and may generate a signal output 662. The symbol processor 624 may be also adapted to remove one or more Gold codes from the combined signal estimate 660. The diversity processor 626 may perform diversity processing on the signal 662, in accordance with one or more diversity modes, such as open loop (OL), closed loop 1 (CL1), and/or closed loop 2 (CL2). The output signal 664 from the diversity processor 626 may be communicated to the HARQ processor 628.

The HARQ processor 628 may handle the bit rate processing (such as de-interleaving and depuncturing) within the output signal 664 generated by the diversity processor 626. The output of the HARQ processor 628 may be buffered by the virtual buffer 630 and then may be processed by the turbo decoder 632. The turbo decoder 632 may decode turbo codes within the output signal generated by the convolutional decoder 628. The output of the turbo decoder 632 may be a digital signal, which may comprise, for example, data information that may be suitable for use by a video display processor.

In one embodiment of the invention, the receiver 600 may function as a SISO receiver. In such instances, the second antenna received signal 636 may be equal to zero. In this regard, the corresponding channel response 644, correlations 648, 650, and the equalizer taps or weights 654 may also equal zero. The LMMSEE 608 may equalize the received signal 634 in the time domain by computing the autocorrelation 646 across taps. The equalizer output 660 may then be communicated to the symbol processor 624 for further processing, such as demodulation.

In another embodiment of the invention, the receiver 600 may function as a SIMO receiver. In such instances, both received signals 634 and 636 may be active and processed by the CPP 602 and the LMMSEE 608. In yet another embodiment of the invention, the space-time weights or equalizer tap values 652 and 654 may be computed iteratively to solve for a Wiener solution, for example, by computing a space-time correlation matrix of the received vector. In this regard, signals 656 and 658 may be combined in a linear optimal way by using the equalizer taps 652, 654 generated from the correlation values 646, 648, 650, as well as the channel responses 642, 644 of the desired signal. In instances when there is no multipath interference and no MAI, or outside interference, then the LMMSEE 608 may combine the received signal coherently according to a maximum ratio combining (MRC) algorithm, for example. In instances when there is multipath interference and there is no outside interference, then the LMMSEE 608 may equalize the received signal to reduce inter-path interference (IPI). In instances when there is multipath interference and outside interference, then the LMMSEE 608 may be adapted to balance between IPI reduction and interference cancellation (IC) to yield a maximum SINR for the received signal.

FIG. 7A is a block diagram of a multiple-input-single-output (MISO) receiver utilizing conjugate gradient optimization, in accordance with an embodiment of the invention. Referring to FIG. 7A, the MISO receiver 700 may comprise a CPP 702, a correlator 704, and conjugate gradient blocks (CGB) 706 and 708. The receiver 700 may further comprise a receive antenna 710, which may receive signals from transmit antennas 712 and 714. The CPP 702 may comprise suitable circuitry, logic and/or code and may enable generation of channel responses 718, 720 based on input wireless signal 716 received via receive antenna 710. The CPP 702 may also generate chip-rate synchronously sampled signal 722, which may be communicated to the correlator block 704.

The correlator block 704 may comprise suitable circuitry, logic and/or code and may enable generation of correlation values 724 based on the generated chip-rate synchronously sampled signal 722 received from the CPP 702. The correlation values 724 as well as the channel responses 718 and 720 may be communicated to the CGB blocks 706 and 708, respectively.

The CGB 706, 708 may comprise suitable circuitry, logic and/or code and may enable generating and updating of equalizer tap values based on, for example, a conjugate gradient-based algorithm. The CGB 706, 708 may then use the equalizer tap values to generate one or more signal estimates of the transmitted signal. In one embodiment of the invention, the CGB 706 and 708 may each comprise a CGTO block, one or more FIR filters, and/or a summer block, similar to the CGTO 616, FIR filters 618, 620, and the summer 622 of FIG. 6. In this regard, the CGB 706, 708 may have functionalities that are similar to the LMMSEE 608 of FIG. 6.

In one embodiment of the invention, the CGB 706, 708 may each comprise an equalizer, which may equalize the received signal 716 both in the time domain and in the spatial domain by implementing, for example, a Wiener algorithm. In this regard, the CGB 706, 708 may each enable space-time transmit diversity (STTD) processing via a linear MMSE equalizer to generate equalized signal estimates 726 and 728, corresponding to the received signal 716. Weights or equalizer tap values within the LMMSE equalizer within the receiver 700 may be computed iteratively by a time-based adaptation method, according to a Conjugate Gradient search algorithm, for example. Furthermore, weights or equalizer tap values may be applied to the received signal 716 by a time-based convolution module. In instances when STTD is used at the transmitter, the equalized signal estimates 726 and 728 may be passed through a STTD decoding block (similar to the block 626 of FIG. 6) to recover estimate of the transmit signal.

FIG. 7B is a block diagram of a multiple-input-single-output (MISO) receiver utilizing conjugate gradient optimization, in accordance with an embodiment of the invention. Referring to FIG. 7B, the MISO receiver 750 may comprise a CPP 702, a correlator 704, and a CGB 706. The receiver 750 may further comprise a receive antenna 710, which may receive signals from transmit antennas 712 and 714. The receiver 750 may have the same functionalities as the receiver 700 of FIG. 7A. However, the receiver 750 may comprise only a single CGB 706, rather that two CGBs, and the single CGB 706 may be adapted to process and generate both signal estimates 752 and 754.

FIG. 8A is a block diagram of a multiple-input-multiple-output (MIMO) receiver utilizing conjugate gradient optimization and linear processing, in accordance with an embodiment of the invention. Referring to FIG. 8A, the HSDPA MIMO receiver for linear processing 800 may comprise cluster path processors (CPPB) 802, 803, delay matching blocks 817, 819, and a linear minimum mean squared error equalizer (LMMSEE) 804. The receiver 800 may further comprise symbol processors 806, 808, diversity processors 810, 812, hybrid automatic repeat request (HARQ) processors with buffers 814, 816, and a turbo decoder 818. The LMMSEE 804 may comprise a correlator 832, conjugate gradient taps optimizers (CGTOs) 834, 836, and finite impulse response (FIR) filters or equalizers 838, 840.

In one embodiment of the invention, an HSDPA receiver using conjugate gradient equalization, such as the receiver 800, may be adapted to process SM-MIMO signals by including the additional CPP 803. The additional CPP 803 may be used to estimate the channel gains corresponding to a second transmit antenna. Within the LMMSE equalizer block 804, the computation of the correlation matrix may remain unchanged from the SIMO signal processing, as illustrated in FIG. 6. The CGTO blocks 834, 836 may be used to compute the weights or equalizer tap values 844, . . . , 850 corresponding to the first and second transmit antenna. The equalizer blocks or convolution blocks 838, 840 may also be duplicated to create two equalizer outputs 805, 807, one for each transmitted sub-stream.

The CPPs 802, 803 may comprise suitable circuitry, logic and/or code and may enable generation of channel responses 828, . . . , 831 based on input wireless signals 820, 822, 833, 835 received via one or more receive antennas. The CPPs 802, 803 may also generate chip-rate synchronously sampled signals 824, 826, which may be delay-matched by the delay matching blocks 817, 819, respectively. In one embodiment of the invention, the CPP 802 may be utilized for channel estimation of a first sub-stream of received signals 820 and 822, and the CPP 803 may be utilized for channel estimation of a second sub-stream of received signals 833 and 835. In addition, the first and second sub-streams may share the same Gold code and/or the same Orthogonal Variable Spreading Factor (OVSF) code. In some instances, depending on channel quality indicator (CQI) value, each sub-stream may be encoded with a plurality of parallel OVSF codes.

The correlator block 832 may comprise suitable circuitry, logic and/or code and may enable generation of correlation values 842 based on the generated chip-rate synchronously sampled signals 824, 826 received from the delay matching blocks 817, 819. The correlation values 842 as well as the channel responses 828, . . . , 831 may be communicated to the CGTO blocks 834, 836.

The CGTO blocks 834, 836 may comprise suitable circuitry, logic and/or code and may enable generating and updating of equalizer tap values 844, . . . , 850, based on, for example, a conjugate gradient-based algorithm. The generated equalizer tap values 844, . . . , 850 may be communicated to the FIR filters 838, 840 for further processing. The FIR filters 838, 840 may comprise suitable circuitry, logic and/or code and may generate transmitted signal estimates 805, 807 based on the generated chip-rate synchronously sampled signals 824, 826 and the updated equalizer/filter taps 844, . . . , 850.

In one embodiment of the invention, the weights or equalizer tap values 844, . . . , 850 within the LMMSE equalizer 804 within the receiver 800 may be computed iteratively by a time-based adaptation method, according to a Conjugate Gradient search algorithm, for example. Furthermore, weights or equalizer tap values 844, . . . , 850 may be applied to the received signals 820, 822, 833, 835 by a time-based convolution module.

The symbol processors 806, 808 may comprise suitable circuitry, logic and/or code and may be adapted to demodulate and/or despread the signal estimates 805, 807. The symbol processors 806, 808 may be also adapted to remove one or more Gold codes from the signal estimates 805, 807. The diversity processors 810, 812 may comprise suitable circuitry, logic and/or code and may be adapted to combine signals transmitted from multiple antennas in diversity modes within the receiver 800. The diversity modes may comprise open loop (OL), closed loop 1 (CL1), and/or closed loop 2 (CL2), for example.

The HARQ processors 814, 816 may comprise suitable logic, circuitry and/or code that may be utilized to handle the bit rate processing (such as de-interleaving and depuncturing) within the output signals 813, 815 generated by the diversity processors 810, 812. The turbo decoder 818 may comprise suitable logic, circuitry and/or code that may be utilized to handle decoding of turbo codes within the output signals 823, 839 generated by the HARQ processors 814, 816. The outputs 841, 843 of the turbo decoder 818 may be a digital signal, which may comprise, for example, data information that may be suitable for use by a video display processor.

FIG. 8B is a block diagram of a multiple-input-multiple-output (MIMO) receiver utilizing conjugate gradient optimization and non-linear processing, in accordance with an embodiment of the invention. Referring to FIG. 8B, the HSDPA MIMO receiver 852 may comprise cluster path processors (CPPs) 854, 856, adders 858, 862, demultiplexers 860, 899, and a linear minimum mean square error equalizer (LMMSEE) 866. The receiver 800 may further comprise symbol processors 868, 870, a switch 872, hybrid automatic repeat request (HARQ) processors with buffers 874, a turbo decoder 876, and a signal processor 878.

In one embodiment of the invention, the HSDPA MIMO receiver 852 may support per-antenna rate control (PARC) technology and may apply separate encoding and rate control on each transmitted stream. The receiver 852 may also utilize successive interference cancellation (SIC). In this regard, the receiver 852 may detect the sub-stream with the highest post-processing SINR, and may subtract the detected sub-stream, post-decoding, from the received signal, thereby significantly improving the detection of the second sub-stream. In addition, the receiver 852 may utilize separate time domain coding on each sub-stream, as opposed to joint space-time coding, to achieve non-linear processing PARC and SIC.

The CPPs 854, 856, the delay matching blocks 860, 899, the LMMSEE 866, the symbol processors 868, 870, the HARQ processor 874, and the turbo decoder 876 may have the same functionality as analogous blocks illustrated and discussed above with regard to FIG. 8A. The signal processor 878 may comprise suitable circuitry, logic and/or code and may further process the signal estimate 859 to generate output signals 861, 863 which may be used for signal cancellation via the adders 858, 862.

In operation, the LMMSEE 866 may communicate the equalized signal estimates 896, 898 to the symbol processors 868, 870 for processing. The symbol processors 868, 870 may perform symbol processing and may also estimate SINR values for each of the equalized signals 896, 898. The estimated SINR values may be communicated together with the output signals 853, 855 to the switch 872. The switch 872 may select a signal from the output signals 853, 855, based on the calculated SINR values. For example, the switch 872 may select the signal with the higher SINR value for further processing.

After the selected signal is processed by the HARQ processor 874 and the turbo decoder 876, the generated signal estimate 859 may be communicated to the signal processor 878. The signal processor 878 may reconstruct the signal estimate 859 and may generate output signals 861, 863 for signal cancellation. The signal reconstruction may comprise re-encoding of decoded bits, re-mapping of symbols, re-multiplication by channel estimates 886, 890 and/or symbol spreading.

The generated output signals 861 and 863, which are based on the signal estimate 859 with a maximum SINR value, may be communicated to the adders 858 and 862. The adders 858 and 862 may subtract the signals 861, 863 from the received signals 884 and 888, respectively. In this regard, the LMMSEE 866 may continue processing of the remaining second signal sub-stream.

FIG. 9 is a flow diagram illustrating exemplary steps for processing signals in a receiver utilizing a linear MMSE equalization, in accordance with an embodiment of the invention. Referring to FIGS. 8B and 9, at 902, the CPP 854 may generate a plurality of chip-rate synchronously sampled signals 884, 888 utilizing a plurality of received clusters 880, 882. At 904, the LMMSEE 866 may simultaneously equalize in time domain and in spatial domain at least a portion of the generated plurality of chip-rate synchronously sampled signals 884, 888. The equalization may be based on a plurality of weight values calculated for the plurality of received clusters 880, 882. The weight values may be iteratively computed utilizing a time-based adaptation method, for example. At 906, the symbol processors 868, 870 may demodulate the equalized signals 896, 898 to generate demodulated signals 853, 855. At 908, the symbol processors 868, 870 may also determine at least one signal-to-interference-and-noise ratio (SINR) value for the demodulated signals 853, 855.

At 910, the switch 872 may select a maximum one of the determined SINR values. The selected maximum SINR value may correspond to a selected one of the demodulated signals 853, 855. At 912, the HARQ processor 874 and/or the turbo decoder 876 may decode the selected demodulated signal. At 914, the selected signal may be processed by the signal processor 878 to generate output signals 861, 863. The generated output signal 861, 863 may be subtracted from the plurality of chip-rate synchronously sampled signals 884, 888 to generate a remaining signal sub-stream. At 916, the generated signal sub-stream may be decoded.

Certain embodiments of the invention may comprise a machine-readable storage having stored thereon, a computer program having at least one code section for processing signals in a receiver, the at least one code section being executable by a machine for causing the machine to perform one or more of the steps described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
    performing by one or more processors and/or circuits in a wireless device comprising a plurality of transmit and/or receive antennas for one or more of HSDPA, space-time transmit diversity (STTD), Closed Loop, Normal Mode and spatial multiplexing, the one or more processors and/or circuits comprising a minimum mean square error (MMSE) equalizer:
        generating a plurality of chip-rate synchronously sampled signals utilizing a plurality of received clusters; and
        simultaneously equalizing in time domain and in spatial domain at least a portion of said generated plurality of chip-rate synchronously sampled signals, based on a plurality of weight values calculated for said plurality of received clusters, wherein said plurality of weight values are iteratively computed utilizing a time-based adaptation method.

2. The method according to claim 1, wherein said time-based adaptation method utilizes at least one of a plurality of cluster path processes.

3. The method according to claim 2, wherein said time-based adaptation method is dedicated to each of said plurality of cluster path processes.

4. The method according to claim 2, comprising equalizing and separating the signals received by said plurality of receive antennas into a plurality of transmit signals using said MMSE equalizer.

5. The method according to claim 1, wherein said plurality of weight values comprise a plurality of equalizer filter tap values.

6. The method according to claim 5, wherein said plurality equalizer filter tap values are iteratively computed using a plurality of iterations.

7. The method according to claim 6, comprising computing, during each of said plurality of iterations, a current equalizer filter tap value of said plurality of filter tap values.

8. The method according to claim 7, comprising equalizing in time domain and in spatial domain at least a portion of said generated plurality of chip-rate synchronously sampled signals, based at least in part on said current equalizer filter tap value.

9. The method according to claim 1, comprising adding said equalized said at least said portion of said generated plurality of chip-rate synchronously sampled signals to generate a total equalized signal.

10. The method according to claim 1, comprising iteratively computing said plurality of weight values using at least one linear MMSE optimizer.

11. The method according to claim 10, wherein said linear MMSE optimizer comprises a conjugate gradient optimizer.

12. The method according to claim 9, comprising demodulating said total equalized signal to generate a demodulated signal.

13. The method according to claim 12, comprising decoding at least one convolutional code within said demodulated signal.

14. The method according to claim 12, comprising decoding at least one turbo code within said demodulated signal.

15. The method according to claim 1, comprising demodulating said equalized said at least said portion of said generated plurality of chip-rate synchronously sampled signals to generate at least one demodulated signal.

16. The method according to claim 15, comprising determining at least one signal-to-interference-and-noise ratio (SINR) value for said at least one demodulated signal.

17. The method according to claim 16, comprising initiating a second iterative computation of at least another plurality of weight values based on said determined SINR value.

18. The method according to claim 16, comprising terminating said iterative computation of said plurality of weight values, and initiating a second iterative computation of at least another plurality of weight values based on said determined SINR value.

19. The method according to claim 16, comprising selecting a maximum one of said determined at least one SINR value, wherein said selected maximum one of said determined at least one SINR value corresponds to a first portion of said at least one demodulated signal.

20. The method according to claim 19, comprising decoding said first portion of said at least one demodulated signal.

21. The method according to claim 20, comprising:
    subtracting said decoded said first portion of said at least one demodulated signal from said plurality of chip-rate synchronously sampled signals to generate at least one remaining signal; and
    decoding said generated at least one remaining signal.

22. The method according to claim 1, wherein said received clusters are received via one or more receive antennas.

23. The method according to claim 1, wherein said received clusters are transmitted by a transmitter via one or more transmit antennas, wherein said transmitter transmits said received clusters utilizing at least one of the following modes: a normal mode using a single transmit antenna, an open loop (OL) transmit diversity mode, a closed loop (CL) transmit diversity mode, and a spatial multiplexing mode.

24. The method according to claim 1, wherein said iterative computation utilizing said time-based adaptation method comprises:
    generating a vector set of correlation values based on said generated plurality of chip-rate synchronously sampled signals;
    generating a plurality of channel responses; and
    generating said weight values based on said generated vector set of correlation values and said generated plurality of channel responses.

25. The method according to claim 1, wherein said simultaneous equalizing comprises suppressing at least one of the following: inter-symbol interference (ISI), inter-carrier interference (ICI), and multiple access interference (MAI) within said plurality of received clusters.

26. A system for processing signals, the system comprising:
one or more processors and/or circuits in a wireless device comprising a plurality of transmit and/or receive antennas for one or more of HSDPA, space-time transmit diversity (STTD), Closed Loop, Normal Mode and spatial multiplexing, the one or more processors and/or circuits comprising a minimum mean square error (MMSE) equalizer, and the one or more processors and/or circuits are operable to:
generate a plurality of chip-rate synchronously sampled signals utilizing a plurality of received clusters; and
simultaneously equalize in time domain and in spatial domain, at least a portion of said generated plurality of chip-rate synchronously sampled signals, based on a plurality of weight values calculated for said plurality of received clusters, wherein said plurality of weight values are iteratively computed utilizing a time-based adaptation method.

27. The system according to claim 26, wherein said time-based adaptation method utilizes at least one of a plurality of cluster path processes.

28. The system according to claim 27, wherein said time-based adaptation method is dedicated to each of said plurality of cluster path processes.

29. The system according to claim 26, wherein said one or more processors and/or circuits are operable to equalize and separate the signals received by said plurality of receive antennas into a plurality of transmit signals using said MMSE equalizer.

30. The system according to claim 26, wherein said plurality of weight values comprise a plurality of equalizer filter tap values.

31. The system according to claim 30, wherein said plurality equalizer filter tap values are iteratively computed using a plurality of iterations.

32. The system according to claim 31, wherein said one or more processors and/or circuits are operable to compute, during each of said plurality of iterations, a current equalizer filter tap value of said plurality of filter tap values.

33. The system according to claim 32, wherein said one or more processors and/or circuits are operable to equalize in time domain and in spatial domain at least a portion of said generated plurality of chip-rate synchronously sampled signals, based at least in part on said current equalizer filter tap value.

34. The system according to claim 26, wherein said one or more processors and/or circuits are operable to add said equalized said at least said portion of said generated plurality of chip-rate synchronously sampled signals to generate a total equalized signal.

35. The system according to claim 26, wherein said one or more processors and/or circuits are operable to iteratively compute said plurality of weight values using at least one linear MMSE optimizer.

36. The system according to claim 35, wherein said linear MMSE optimizer comprises a conjugate gradient optimizer.

37. The system according to claim 34, wherein said one or more processors and/or circuits are operable to demodulate said total equalized signal to generate a demodulated signal.

38. The system according to claim 35, wherein said one or more processors and/or circuits are operable to decode at least one convolutional code within said demodulated signal.

39. The system according to claim 35, wherein said one or more processors and/or circuits are operable to decode at least one turbo code within said demodulated signal.

40. The system according to claim 26, wherein said one or more processors and/or circuits are operable to demodulate said equalized said at least said portion of said generated plurality of chip-rate synchronously sampled signals to generate at least one demodulated signal.

41. The system according to claim 40, wherein said one or more processors and/or circuits are operable to determine at least one signal-to-interference-and-noise ratio (SINR) value for said at least one demodulated signal.

42. The system according to claim 41, wherein said one or more processors and/or circuits are operable to initiate a second iterative computation of at least another plurality of weight values based on said determined SINR value.

43. The system according to claim 41, wherein said one or more processors and/or circuits are operable to terminate said iterative computation of said plurality of weight values, and initiate a second iterative computation of at least another plurality of weight values based on said determined SINR value.

44. The system according to claim 41, wherein said one or more processors and/or circuits are operable to select a maximum one of said determined at least one SINR value, wherein said selected maximum one of said determined at least one SINR value corresponds to a first portion of said at least one demodulated signal.

45. The system according to claim 44, wherein said one or more processors and/or circuits are operable to decode said first portion of said at least one demodulated signal.

46. The system according to claim 45, wherein said one or more processors and/or circuits are operable to:
subtract said decoded said first portion of said at least one demodulated signal from said plurality of chip-rate synchronously sampled signals to generate at least one remaining signal; and
decode said generated at least one remaining signal.

47. The system according to claim 26, wherein said received clusters are received via one or more receive antennas.

48. The system according to claim 26, wherein said received clusters are transmitted by a transmitter via one or more transmit antennas, wherein said transmitter transmits said received clusters utilizing at least one of the following modes: a normal mode using a single transmit antenna, an open loop (OL) transmit diversity mode, a closed loop (CL) transmit diversity mode, and a spatial multiplexing mode.

49. The system according to claim 26, wherein said iterative computation utilizing said time-based adaptation method comprises:
generating a vector set of correlation values based on said generated plurality of chip-rate synchronously sampled signals;
generating a plurality of channel responses; and
generating said weight values based on said generated vector set of correlation values and said generated plurality of channel responses.

50. The system according to claim 26, wherein said simultaneous equalizing comprises suppressing at least one of the following: inter-symbol interference (ISI), inter-carrier interference (ICI), and multiple access interference (MAI) within said plurality of received clusters.

* * * * *